(12) United States Patent
Kitagishi (10) Patent No.: US 9,570,914 B2
(45) Date of Patent: Feb. 14, 2017

(54) ELECTRIC POWER RETAIL MANAGEMENT APPARATUS AND ELECTRIC POWER RETAIL MANAGEMENT METHOD

(71) Applicant: YAHOO JAPAN CORPORATION, Tokyo (JP)

(72) Inventor: Ikuo Kitagishi, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 419 days.

(21) Appl. No.: 14/302,973

(22) Filed: Jun. 12, 2014

(65) Prior Publication Data

US 2014/0375126 A1     Dec. 25, 2014

(30) Foreign Application Priority Data

Jun. 20, 2013   (JP) .................... 2013-129750

(51) Int. Cl.
| | | |
|---|---|---|
| H02J 3/00 | (2006.01) | |
| H02J 3/38 | (2006.01) | |
| G06Q 30/06 | (2012.01) | |
| G06Q 50/06 | (2012.01) | |

(52) U.S. Cl.
CPC ................ *H02J 3/38* (2013.01); *G06Q 30/06* (2013.01); *G06Q 50/06* (2013.01); *H02J 3/008* (2013.01); *Y04S 50/10* (2013.01); *Y10T 307/391* (2015.04)

(58) Field of Classification Search
CPC ........................................................ H02J 3/00
USPC .......................................................... 307/29
See application file for complete search history.

(56) References Cited

FOREIGN PATENT DOCUMENTS

| | | |
|---|---|---|
| JP | 2001184406 A | 7/2001 |
| JP | 2002044864 A | 2/2002 |
| JP | A-2002-123578 | 4/2002 |
| JP | 2002354667 A | 12/2002 |
| JP | 2004088847 A | 3/2004 |
| JP | 2009070083 A | 4/2009 |

OTHER PUBLICATIONS

Apr. 21, 2015 Office Action issued in Japanese Application No. 2013-129750.
Feb. 2, 2016 Office Action issued in Japanese Patent Application No. 2013-129750.

*Primary Examiner* — Robert Deberadinis
(74) *Attorney, Agent, or Firm* — Oliff PLC (57) ABSTRACT

An electric power retail management apparatus according to an embodiment includes a power generation source selection unit. The power generation source selection unit selects, as a power generation source for supplying electric power corresponding to an amount of electric power supplied to each of electric power consumers, one or more power generation sources of which one or more types are selected by each of the electric power consumers from among a plurality of power generation sources for each electric power consumer on the basis of an amount of electric power supplied from the power generation sources.

12 Claims, 5 Drawing Sheets

| USER ID | CONTRACT CAPACITY | CONTRACT TYPE |
|---|---|---|
| U101 | 10 A | ONLY SOLAR POWER GENERATION |
| U102 | 30 A | ONLY NATURAL ENERGY |
| U103 | 20 A | NATURAL ENERGY 50%, AND THERMAL POWER GENERATION 50% |
| U104 | 40 A | POWER RATE PLAN A |
| ⋮ | ⋮ | ⋮ |

FIG.5

| USER ID | EXCESSIVE AMOUNT OF ELECTRIC POWER | POWER CONSUMPTION AMOUNT AT THIS TIME | POWER CONSUMPTION AMOUNT AT LAST TIME | ... |
|---|---|---|---|---|
| U101 | 52 Wh | 235 Wh | 363 Wh | ... |
| U102 | — | 652 Wh | 1052 Wh | ... |
| U103 | — | 352 Wh | 894 Wh | ... |
| U104 | — | 753 Wh | 1205 Wh | ... |
| ⋮ | ⋮ | ⋮ | ⋮ | ⋮ |

FIG.6

| ELECTRIC POWER GENERATING COMPANY ID | TYPE OF POWER GENERATION SOURCE | POWER GENERATION AMOUNT | MAXIMUM POWER GENERATION AMOUNT | POWER GENERATION FEE |
|---|---|---|---|---|
| E101 | SOLAR POWER GENERATION | 1.4 MWh | 3 MWh | ¥30/kW |
| E102 | WIND POWER GENERATION | 2.4 MWh | 5 MWh | ¥21/kW |
| E103 | HYDROELECTRIC POWER GENERATION (NOT PUMPING) | 39 MWh | 60 MWh | ¥12/kW |
| E104 | THERMAL POWER GENERATION (NATURAL GAS) | 576 Wh | 1000 Wh | ¥7/kW |
| E105 | NUCLEAR POWER GENERATION | 1205 Wh | 2000 Wh | ¥4/kW |
| E106 | SOLAR POWER GENERATION | 3.9 MWh | 5 MWh | ¥35/kW |
| E107 | HYDROELECTRIC POWER GENERATION (PUMPING) | 22 MWh | 100 MWh | ¥12/kW |
| E108 | SOLAR POWER GENERATION | 0.8 MWh | 10 MWh | ¥33/kW |
| E109 | THERMAL POWER GENERATION (PETROLEUM) | 889 Wh | 1500 Wh | ¥15/kW |
| E110 | THERMAL POWER GENERATION (COAL) | 223 Wh | 500 Wh | ¥5/kW |
| ⋮ | ⋮ | ⋮ | ⋮ | ⋮ |

FIG.7

ELECTRIC POWER RETAIL MANAGEMENT APPARATUS AND ELECTRIC POWER RETAIL MANAGEMENT METHOD

CROSS-REFERENCE TO RELATED APPLICATIONS

The present application claims priority to and incorporates by reference the entire contents of Japanese Patent Application No. 2013-129750 filed in Japan on Jun. 20, 2013.

BACKGROUND OF THE INVENTION

1. Field of the Invention

The present invention relates to an electric power retail management apparatus and an electric power retail management method.

2. Description of the Related Art

Conventionally, electric power companies have exclusively supplied electric power to electric power consumers. However, electric power retailers are enabled to enter such an electric power supply market following revision of the Electricity Business Act. The electric power retailers needs to adjust a power supply amount so that supply and demand are balanced when electric power for retail that is purchased from an electric power generating company is supplied to each of a plurality of electric power consumers who has made a contract. However, unexpected demand variation may occur in some cases.

Accordingly, an electric power retail system has been developed for adjusting demand and supply to cope with unexpected demand variation on the day in question and securing electric power required for supply to an electric power consumer (for example, refer to Japanese Patent Application Laid-open No. 2002-123578).

However, with the conventional system described above, the electric power consumer can designate only a required amount of electric power, and needs corresponding to a preference of the electric power consumer cannot be reflected.

SUMMARY OF THE INVENTION

An electric power retail management device according to an embodiment includes a selection information storage unit, a power consumption amount information acquisition unit, a power generation amount information acquisition unit, and a power generation source selection unit. The selection information storage unit stores therein selection information including information corresponding to a type of a power generation source selected by each of a plurality of electric power consumers. The power consumption amount information acquisition unit acquires, as information about a power consumption amount, information about an amount of electric power supplied from a power transmission and distribution network to the electric power consumers. The power generation amount information acquisition unit acquires, as information about a power generation amount, information about an amount of electric power supplied from a plurality of power generation sources to the power transmission and distribution network. The power generation source selection unit selects, as a power generation source for supplying electric power corresponding to the power consumption amount, one or more power generation sources of which the type corresponds to the selection information from among the power generation sources for each of the electric power consumers based on the power generation amount.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of an electric power retail management apparatus and an electric power retail management method according to the present application in detail with reference to drawings. The electric power retail management apparatus and the electric power retail management method according to the present application are not limited to the embodiment.

1. Electric Power Retail Management Processing

Figure 1:
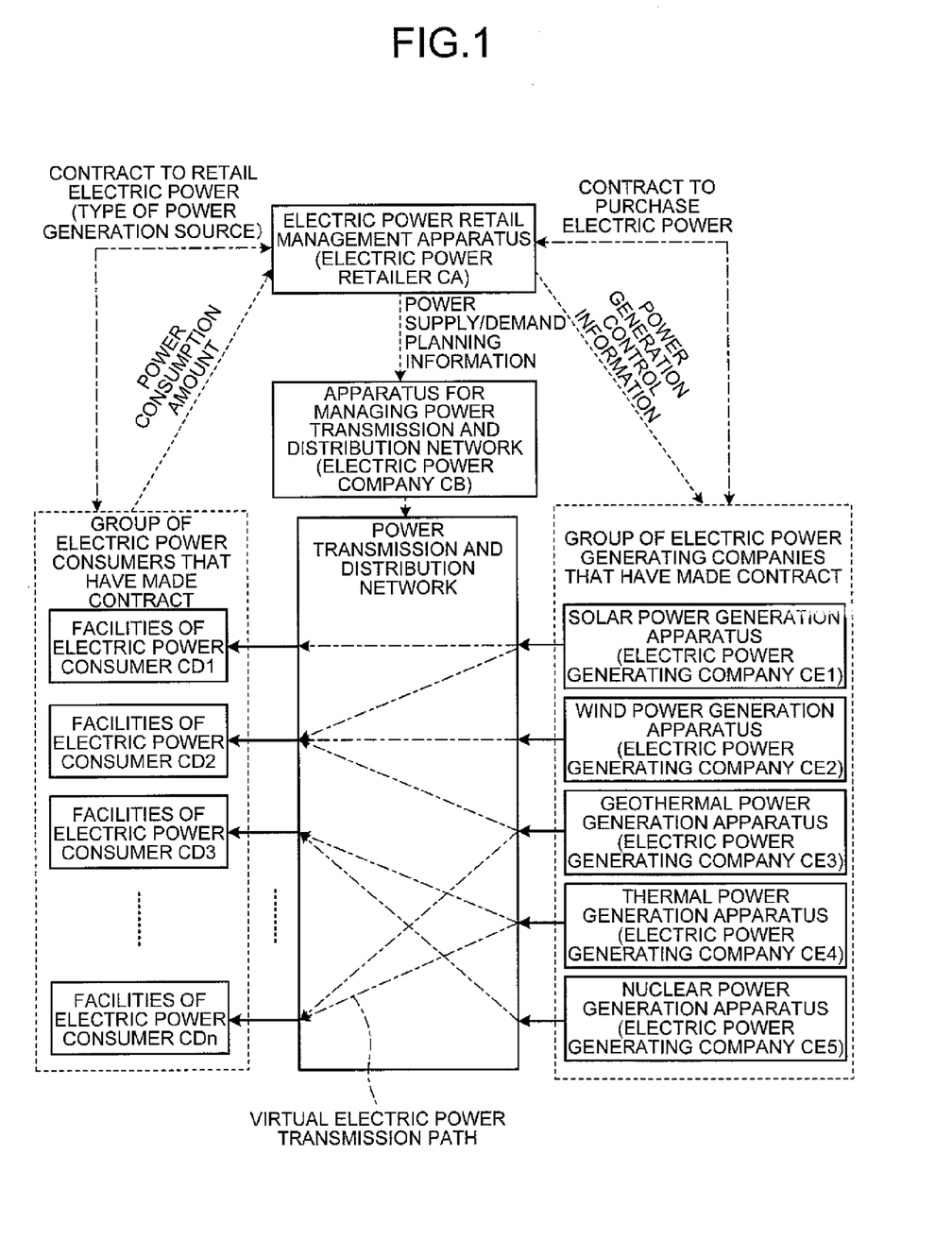
FIG. 1 is an explanatory diagram of electric power retail management processing according to an embodiment.

First, the following describes electric power retail management processing according to the embodiment. FIG. 1 is an explanatory diagram of the electric power retail management processing according to the embodiment. In the present embodiment, the electric power retail management apparatus performs the electric power retail management processing.

An electric power system illustrated in FIG. 1 includes a power transmission and distribution network, a apparatus for managing the power transmission and distribution network, and the electric power retail management apparatus. An electric power company CB manages the power transmission and distribution network and the apparatus for managing the power transmission and distribution network. An electric power retailer CA manages the electric power retail management apparatus.

The electric power retailer CA makes a contract in advance with a plurality of electric power generating companies CE1 to CE5 (hereinafter, collectively referred to as an electric power generating company CE in some cases) to purchase electric power. The electric power generating company CE1 includes a solar power generation apparatus, the electric power generating company CE2 includes a wind power generation apparatus, the electric power generating company CE3 includes a geothermal power generation apparatus, the electric power generating company CE4 includes a thermal power generation apparatus, and the electric power generating company CE5 includes a nuclear power generation apparatus.

The electric power retailer CA also makes a contract in advance with a plurality of electric power consumers CD1 to CDn (hereinafter, collectively referred to as an electric power consumer CD in some cases) to retail electric power. Such a contract to retail electric power is made by selecting "information corresponding to a type of power generation source". Examples of the "type of power generation source" include solar power generation, wind power generation, geothermal power generation, thermal power generation, and nuclear power generation. Examples of the "information corresponding to a type of power generation source" include information for designating the type of power generation source and information about power rates specified on the basis of the type of power generation source.

The information for designating the type of power generation source is information including one or more types of power generation source, and designates "only solar power generation" or "thermal power generation and nuclear power generation", for example. The "information about power rates specified on the basis of the type of power generation source" is information about a power rate plan corresponding to the type of power generation source, and examples thereof include power rate plans A to C.

The power rate plan A is a plan combining power generation sources so as to minimize a power generation cost. When the power rate plan A is selected, electric power is supplied by combining the nuclear power generation and the thermal power generation, for example. The power rate plan B is a plan combining power generation sources utilizing natural regenerative energy. When the power rate plan B is selected, electric power is supplied by combining the solar power generation, the wind power generation, and the geothermal power generation, for example.

The power rate plan C is, for example, a plan combining the natural regenerative energy and the thermal power generation. When the power rate plan C is selected, electric power is supplied by combining the solar power generation, the wind power generation, the geothermal power generation, and the thermal power generation, for example.

The electric power retail management apparatus causes power generation apparatuses of the electric power generating companies CE1 to CE5 to supply electric power, to the power transmission and distribution network, corresponding to contracts with the electric power consumers CD1 to CDn to retail electric power. In this case, the electric power retail management apparatus creates a power supply/demand plan so that generated power supplied from the power generation apparatuses of the electric power generating companies CE1 to CE5 to the power transmission and distribution network is commensurate with electric power acquired by the electric power consumers CD1 to CDn from the power transmission and distribution network at every predetermined time.

The electric power retail management apparatus transmits power supply/demand planning information to the apparatus for managing the power transmission and distribution network via a communication network. The power supply/demand planning information includes planning information about the generated power supplied from the power generation apparatus of each electric power generating company CE to the power transmission and distribution network and planning information about a power consumption amount by each electric power consumer CD, and is generated in predetermined time units.

Facilities of each electric power consumer CD include a smart meter, which measures an amount of electric power used in the facilities of the electric power consumer CD (hereinafter, referred to as a power consumption amount). Such information about the power consumption amount is transmitted from each smart meter to the electric power retail management apparatus via the communication network. Accordingly, the electric power retail management apparatus can detect the power consumption amount in the facilities of each electric power consumer CD.

The electric power retail management apparatus acquires information about an amount of electric power supplied from the power generation apparatus of the electric power generating company CE to the power transmission and distribution network (hereinafter, referred to as a power generation amount). The electric power retail management apparatus creates the power supply/demand planning information on the basis of the power generation amount of the power generation apparatus of the electric power generating company CE, the power consumption amount in the facilities of the electric power consumer CD, and the contract to retail electric power.

A plan of the power consumption amount of the electric power consumer CD included in the power supply/demand planning information is created using predicted values based on the current power consumption amount and a history of past power consumption amounts, for example. A plan of the power generation amount of each power generation apparatus (hereinafter, referred to as a power generation plan) included in the power supply/demand planning information is set on the basis of the predicted power consumption amount of the electric power consumer CD and the contract to retail electric power.

The electric power retail management apparatus creates power generation control information for each power generation apparatus corresponding to the power generation plan, and transmits the power generation control information to the power generation apparatuses of the electric power generating companies CE1 to CE5 via the communication network. The power generation control information is information for designating the power generation amount of the power generation apparatus. The power generation control information is generated so that the generated power supplied from the power generation apparatuses of the electric power generating companies CE1 to CE5 to the power transmission and distribution network is commensurate with the total power consumption amount per predetermined time, and the type of the electric power corresponds to content of the contract with each electric power consumer CD to retail electric power is obtained.

Accordingly, a virtual electric power transmission path is constructed between the facilities of each electric power consumer CD and the power generation apparatus of each electric power generating company CE, and a request corresponding to the preference of the electric power consumer CD can be reflected. Accordingly, attractive electric power retail service can be provided, which enables the number of users to the electric power retail service to be increased.

For example, when the electric power consumer CD1 desires electric power generated by the solar power generation regardless of a high power rate, the request corresponding to the preference of the electric power consumer CD1 can be met by forming a virtual electric power transmission path between the solar power generation apparatus of the electric power generating company CE1 and the facilities of the electric power consumer CD1.

For example, when the electric power consumer CD3 desires electric power of which the rate is as low as possible, the request from the electric power consumer CD3 can be met by forming a virtual electric power transmission path between the thermal power generation apparatus of the electric power generating company CE4 as well as the nuclear power generation apparatus of the electric power generating company CE5 and the facilities of the electric power consumer CD3.

2. Electric Power System 1

Figure 2:
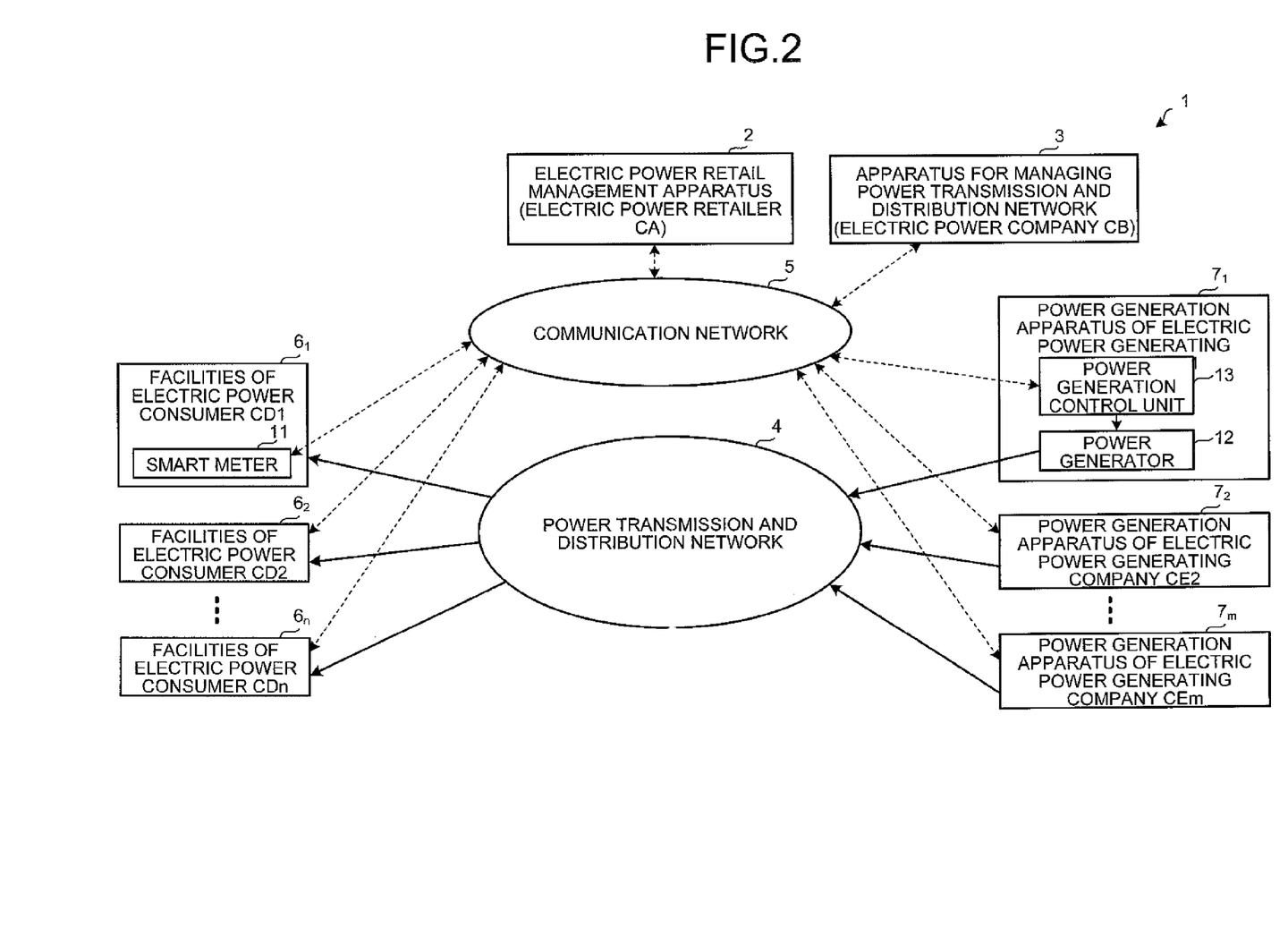
FIG. 2 is a diagram illustrating a configuration example of an electric power system according to the embodiment.

Next, the following further describes the electric power system according to the embodiment with reference to FIG. 2. As illustrated in FIG. 2, an electric power system 1 includes an electric power retail management apparatus 2, a apparatus for managing the power transmission and distribution network 3, a power transmission and distribution network 4, a communication network 5, facilities $6_1$ to $6_n$ of the electric power consumers CD1 to CDn (hereinafter, referred to as electric power consumer facilities $6_1$ to $6_n$), and power generation apparatuses $7_1$ to $7_m$ of electric power generating companies CE1 to CEm.

The electric power company CB manages and operates the apparatus for managing the power transmission and distribution network 3 and the power transmission and distribution network 4. The power transmission and distribution network 4 is connected, for example, to the facilities (not illustrated) of the electric power consumer that makes a contract with the electric power company CB or the power generation apparatus (not illustrated) of the electric power company CB, and manages electric power demand and supply therebetween.

The apparatus for managing the power transmission and distribution network 3 acquires the power supply/demand planning information from the electric power retail management apparatus 2, and gives permission to the power supply/demand planning information. When the electric power is not supplied according to the power supply/demand planning information that is given the permission, the apparatus for managing the power transmission and distribution network 3 makes up for a shortage of the amount of electric power with the generated power from the power generation apparatus of the electric power company CB, and charges the electric power retailer CA for a comparatively high power rate.

Each of the electric power consumer facilities $6_1$ to $6_n$ (hereinafter, collectively referred to as electric power consumer facilities 6 in some cases) includes a smart meter 11. Each smart meter 11 measures the power consumption amount in each of the electric power consumer facilities 6, and information about the power consumption amount measured by each smart meter 11 is transmitted to the electric power retail management apparatus 2 via the communication network 5.

Each of the power generation apparatuses $7_1$ to $7_m$ (hereinafter, collectively referred to as a power generation apparatus 7 in some cases) includes a power generator 12 and a power generation control unit 13. The power generator 12 supplies the generated power to the power transmission and distribution network 4. The power generation control unit 13 controls the power generation amount of the power generator 12. The power generation control unit 13 is connected to the electric power retail management apparatus 2 in a communicable manner via the communication network 5, notifies the electric power retail management apparatus 2 of information about the current power generation amount, and controls the power generator 12 so that the power generation amount corresponding to the generated power control information transmitted from the electric power retail management apparatus 2 can be obtained.

When the power generator 12 is a solar panel or a windmill, for example, the power generation control unit 13 accumulates part of the generated power from the power generator 12 in a power storage apparatus to adjust the generated power to be supplied to the power transmission and distribution network 4. Examples of the power storage apparatus include a battery-type power storage apparatus and a compressed air-type power storage apparatus. The compressed air-type power storage apparatus generates, for example, compressed air using the power generated by the solar power generation, accumulates the compressed air in a tank, and subsequently, generates power by rotating a turbine with the accumulated compressed air.

When the power generator 12 is a solar panel, the power generation control unit 13 can control the power generation amount by changing a direction of the solar panel. When the power generator 12 is a windmill, the power generation control unit 13 can also control the power generation amount by changing a direction of a rotor (propeller).

The power generation control unit 13 outputs information about the current power generation amount and the maximum power generation amount of the power generator 12 to the electric power retail management apparatus 2. According to the information, the electric power retail management apparatus 2 generates and transmits the generated power control information to each power generation apparatus 7 via the communication network 5.

3. Electric Power Retail Management Apparatus 2

Figure 3:
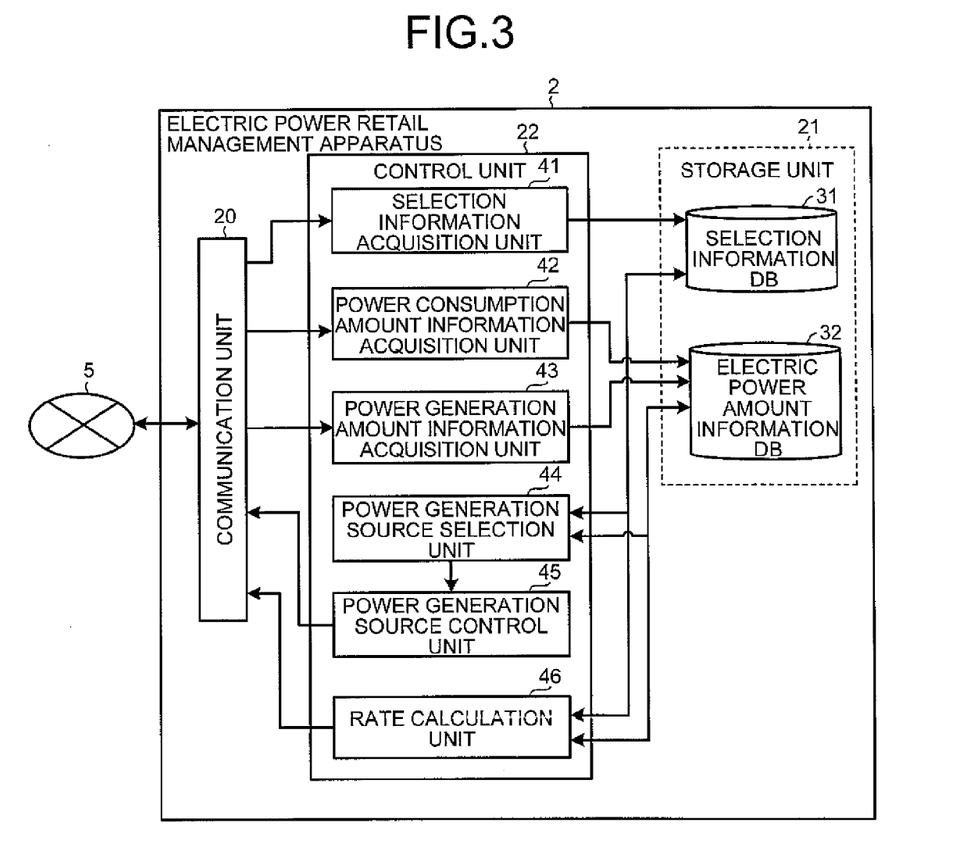
FIG. 3 is a diagram illustrating a configuration example of an electric power retail management apparatus according to the embodiment.

Next, the following describes the electric power retail management apparatus 2 according to the embodiment. FIG. 3 is a diagram illustrating a configuration example of the electric power retail management apparatus 2 according to the embodiment. As illustrated in FIG. 3, the electric power retail management apparatus 2 includes a communication unit 20, a storage unit 21, and a control unit 22.

The communication unit 20 is a communication interface for transmitting/receiving information to/from the communication network 5, and is connected to the communication network 5 in a wired or wireless manner. The control unit 22 can transmit/receive various pieces of information to/from the apparatus for managing the power transmission and distribution network 3, the smart meters 11 of the electric power consumer facilities $6_1$ to $6_n$, and the power generation apparatuses $7_1$ to $7_m$ via the communication unit 20 and the communication network 5.

The storage unit 21 includes a selection information database (DB) 31 and an electric power amount information DB 32. The selection information DB 31 and the electric power amount information DB 32 are, for example, a semiconductor memory device such as a random access memory (RAM) and a flash memory, or a storage device such as a hard disk and an optical disc.

The control unit 22 performs processing for managing electric power for retail. The control unit 22 is made, for example, with an integrated circuit such as an application specific integrated circuit (ASIC) and a field programmable gate array (FPGA). When an internal central processing unit (CPU) or an internal micro processing unit (MPU) executes a computer program stored in an internal storage device in a RAM serving as a working area, the control unit 22 functions as a selection information acquisition unit 41, a power consumption amount information acquisition unit 42, a power generation amount information acquisition unit 43, a power generation source selection unit 44, a power generation source control unit 45, and a rate calculation unit 46.

The configuration of the control unit 22 is not limited thereto, and other configuration may be employed so long as it performs information processing described later. The electric power retail management apparatus 2 also includes a reading device (not illustrated). The control unit 22 can read a computer program recorded in a recording medium into an internal storage device via the reading device and execute the computer program to implement the functions of the control unit 22 described above. Examples of the recording medium include an optical disc, a flexible disk, and a hard disk.

3.1. Selection Information Acquisition Unit 41

The selection information acquisition unit 41 acquires selection information set by the electric power consumer CD from the smart meter 11 of the electric power consumer CD, and updates a selection information table stored in the selection information DB 31. The selection information includes, for example, a user ID, a contract capacity, and a contract type.

Figure 4:
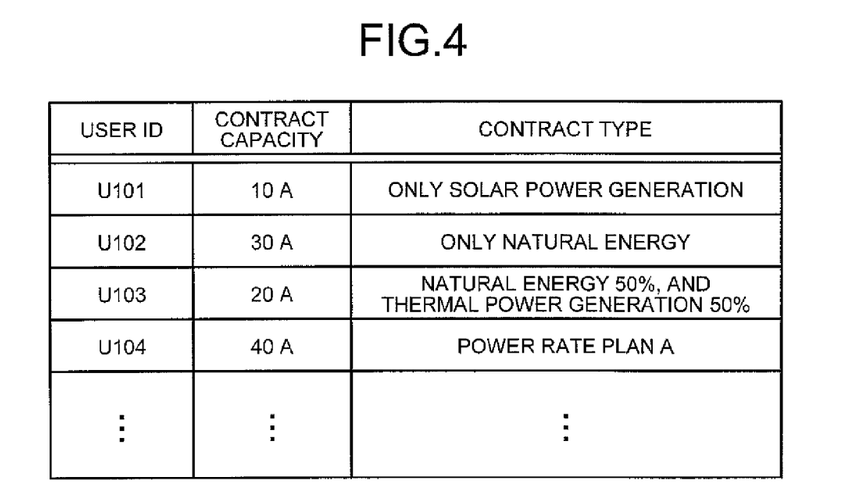
FIG. 4 is a diagram illustrating an example of a selection information table.

FIG. 4 is a diagram illustrating an example of the selection information table. As illustrated in FIG. 4, the selection information table represents information associating the "user ID", the "contract capacity", and the "contract type" with each other. The "user ID" represents identification information of the electric power consumer CD. The "contract capacity" represents an upper limit value of power usage. The "contract type" represents information corresponding to a type of power generation source.

The selection information table illustrated in FIG. 4 indicates that the electric power retailer CA has made a contract with the electric power consumer CD corresponding to the user ID "U101" to retail electric power such that the "contract capacity" is 10 A and the contract type is "only solar power generation". The selection information table also indicates that the electric power retailer CA has made a contract with the electric power consumer CD corresponding to the user ID "U102" to retail electric power such that the "contract capacity" is 30 A and the contract type is "only natural energy".

The selection information table also indicates that the electric power retailer CA has made a contract with the electric power consumer CD corresponding to the user ID "U103" to retail electric power such that the "contract capacity" is 20 A and the contract type is "natural energy 50%, and thermal power generation 50%". The selection information table also indicates that the electric power retailer CA has made a contract with the electric power consumer CD corresponding to the user ID "U104" to retail electric power such that the "contract capacity" is 40 A and the contract type is "power rate plan A". The "power rate plan A" is a rate plan that uses electric power from a power generation source having the lowest cost, and electric power is supplied by combining the thermal power generation and the nuclear power generation, for example.

The selection information acquisition unit 41 updates the selection information table at each time the selection information is received from the smart meter 11. Accordingly, the latest selection information between the electric power retailer CA and the electric power consumer CD is set in the selection information table.

3.2. Power Consumption Amount Information Acquisition Unit 42

The power consumption amount information acquisition unit 42 acquires information about the power consumption amount of each electric power consumer CD from each smart meter 11 via the communication network 5, and updates a power consumption amount table in the electric power amount information DB 32.

Figure 5:
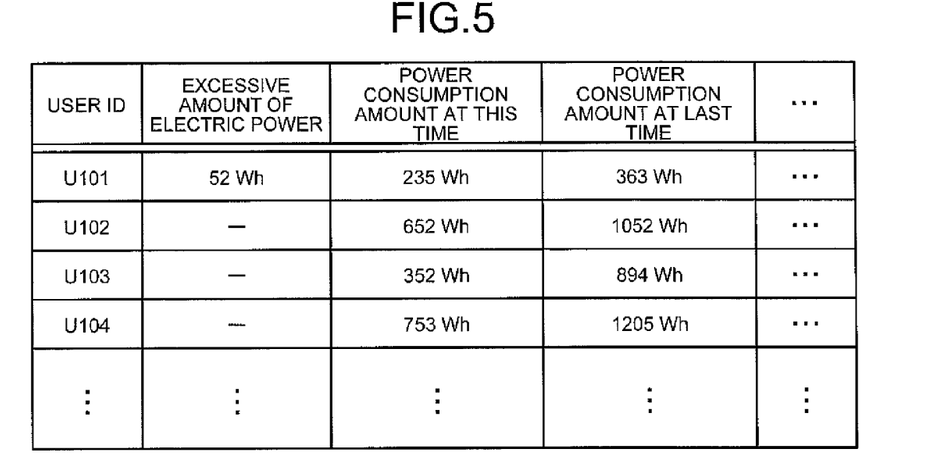
FIG. 5 is a diagram illustrating an example of a power consumption amount table.

FIG. 5 is a diagram illustrating an example of the power consumption amount table. As illustrated in FIG. 5, the power consumption amount table includes information associating pieces of information about "user ID", "excessive amount of electric power", "power consumption amount at this time", and "power consumption amount at the last time" with each other. Although not illustrated, the power consumption amount table also includes information about the power consumption amount at the time preceding the last time.

The information about the power consumption amount set in the power consumption amount table is information to be integrated for each predetermined period TA (for example, 30 minutes). The "power consumption amount at the last time" represents a power consumption amount of the electric power consumer CD during the last predetermined period TA, and the "power consumption amount at this time" represents an integrated value of power consumption amounts of the electric power consumer CD after the last predetermined period TA until the current time.

The "excessive amount of electric power" represents a value obtained by integrating electric power that is used exceeding the contract capacity. The information about the power consumption amount transmitted from the smart meter 11 includes the information about the excessive amount of electric power, and the power consumption amount information acquisition unit 42 updates the "excessive amount of electric power" in the power consumption amount table on the basis of the information about the excessive amount of electric power included in the information about the power consumption amount.

3.3. Power Generation Amount Information Acquisition Unit 43

The power generation amount information acquisition unit 43 acquires information about the maximum power generation amount and the power generation amount of each power generation apparatus 7 from the power generation control unit 13 of each power generation apparatus 7 via the communication network 5, and updates a power generation amount table in the electric power amount information DB 32.

Figure 6:
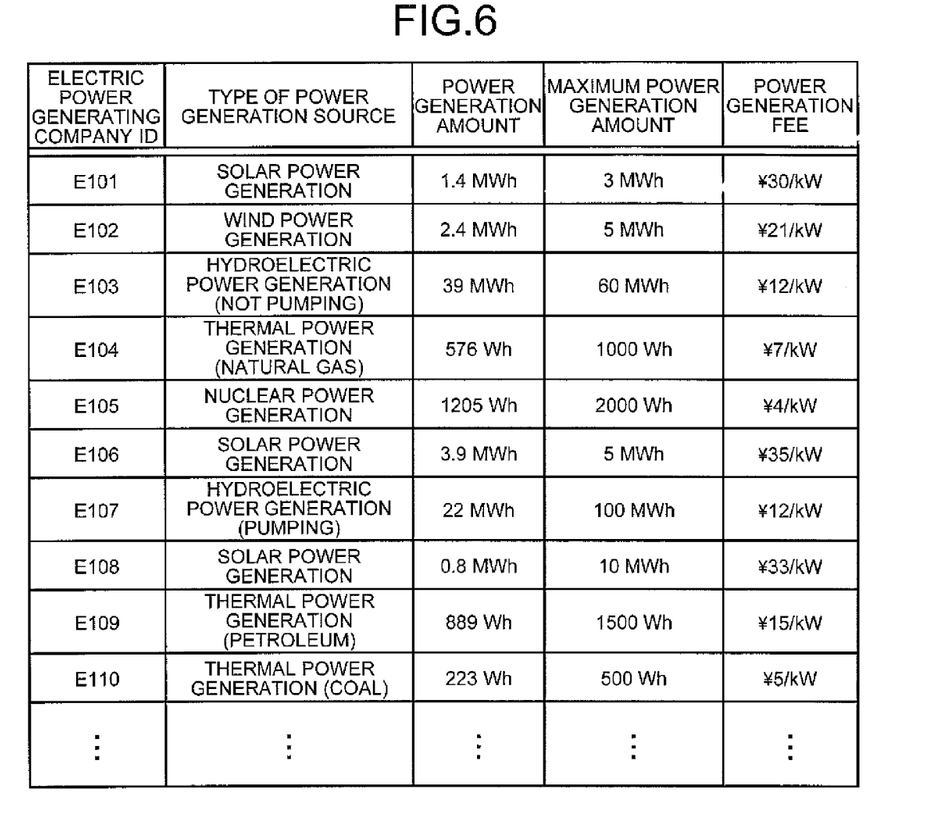
FIG. 6 is a diagram illustrating an example of a power generation amount table.

FIG. 6 is a diagram illustrating an example of the power generation amount table. As illustrated in FIG. 6, the power generation amount table includes information associating pieces of information about "electric power generating company ID", "type of power generation source", "power generation amount", "maximum power generation amount", and "power generation fee".

The "electric power generating company ID" represents identification information of the electric power generating company CE, and the "type of power generation source" represents information indicating a type of the power generator 12 of the power generation apparatus 7 belonging to the electric power generating company CE. The information about the "electric power generating company ID" and the "type of power generation source" is set, for example, in the power generation amount table by the electric power retailer CA after a contract is made between the electric power retailer CA and the electric power generating company CE.

The "power generation amount" represents information about the power generation amount during the predetermined period TA, which is requested by the control unit 22 from each power generation apparatus 7 on the basis of the generated power control information. The "maximum power generation amount" represents the maximum power generation amount of each power generation apparatus 7 in the next predetermined period TA. The "power generation fee" represents a purchase fee for generated power per 1 kW.

3.4. Power Generation Source Selection Unit 44

The power generation source selection unit 44 selects one or more power generation apparatuses 7 for each electric power consumer CD on the basis of the selection information table, the power consumption amount table, and the power generation amount table. Specifically, the power generation source selection unit 44 selects one or more power generation apparatuses 7 corresponding to the selection information, as the power generation apparatus 7 for supplying electric power corresponding to the power consumption amount of each electric power consumer CD, from among the power generation apparatuses 7 for each electric power consumer CD on the basis of the power generation amount of each power generation apparatus 7.

When the power generation source selection unit 44 assigns the power generation apparatus 7 to each electric power consumer CD on the basis of the power consumption amount table and the power generation amount table, simultaneous commensurate selection is performed. The simultaneous commensurate selection is the selection such that the total power generation amount of the power generation apparatuses 7 of the electric power generating companies CE1 to CEm is commensurate with the total power consumption amount of the electric power consumers CD1 to CDn for each predetermined period TA. The power generation source selection unit 44 predicts the total power consumption amount during the next predetermined period TA on the basis of the total power consumption amount during the current predetermined period TA, and performs the simultaneous commensurate selection.

Herein, it is assumed that the selection information table is in the state illustrated in FIG. 4, the power consumption amount table is in the state illustrated in FIG. 5, and the power generation amount table is in the state illustrated in FIG. 6. In this case, the power generation source selection unit 44 assigns, for example, generated power from the power generation apparatus 7 that performs the solar power generation to the electric power consumer CD having the user ID "U101". Examples of the power generation apparatus 7 that performs the solar power generation include the power generation apparatuses 7 having the electric power generating company IDs "E101", "E106", and "E108", and generated power from one or more power generation apparatuses 7 among the above power generation apparatuses 7 is assigned to the electric power consumer CD having the user ID "U101".

For example, the power generation source selection unit 44 assigns generated power from the power generation apparatuses 7 that perform the solar power generation, the wind power generation, and the hydroelectric power generation (not pumping) to the electric power consumer CD having the user ID "U102". The power generation source selection unit 44 assigns, for example, generated power from one or more power generation apparatuses 7 among the power generation apparatuses 7 having the electric power generating company IDs "E101" to "E103", "E106", and "E108" to the electric power consumer CD having the user ID "U102".

For example, the power generation source selection unit 44 assigns generated power to the electric power consumer CD having the user ID "U103" so that 50% of the generated power is from the power generation apparatus 7 that performs power generation using natural energy and 50% of the generated power is from the power generation apparatus 7 that performs the thermal power generation. Examples of the power generation using natural energy include the solar power generation, the wind power generation, and the hydroelectric power generation (not pumping). Examples of the thermal power generation include the thermal power generation (natural gas), the thermal power generation (petroleum), and the thermal power generation (coal).

For example, the power generation source selection unit 44 assigns, to the electric power consumer CD having the user ID "U104", generated power preferentially from the generated power of which the power generation fee is the lowest on the basis of the power generation amount table. For example, the power generation source selection unit 44 assigns power generated by the nuclear power generation of the electric power generating company ID "E105" of which the power generation fee is the lowest.

In this way, on the basis of the selection information table, the power consumption amount table, and the power generation amount table, the power generation source selection unit 44 selects one or more power generation apparatuses 7 of which the type corresponds to the selection information for each electric power consumer CD while controlling the total power consumption amount to be simultaneously commensurate with the total power generation amount. The power generation source selection unit 44 also calculates the amount of electric power to be assigned to each electric power consumer CD from one or more power generation apparatuses 7 of which the type corresponds to the selection information.

The power generation source selection unit 44 selects the power generation apparatus 7 of which the type corresponds to the selection information preferentially from the power generation apparatus 7 of which the power generation fee is the lowest among power generation types corresponding to the selection information. Accordingly, profits of the electric power retailer CA can be increased.

If it is determined that the power generation apparatus 7 of which the type corresponds to the selection information cannot be selected, the power generation source selection unit 44 selects the generated power from the power generation apparatus 7 of which the type does not correspond to the selection information. For example, when the maximum total power generation amount of the solar power generation is lower than the total power consumption amount of the electric power consumer CD, the power generation source selection unit 44 selects, for part of the electric power consumers CD, the generated power from the power generation apparatus 7 of which the type does not correspond to the selection information.

In this case, the power generation source selection unit 44 may select, as the power generation apparatus 7 of which the type does not correspond to the selection information, the power generation apparatus 7 of which the type is similar to the type corresponding to the selection information, for example. When the power generation source of the power generation apparatus 7 corresponding to the selection information is the solar power generation, for example, the similar type to be selected is the power generation apparatus 7 that performs the wind power generation or the geothermal power generation using natural energy as the power generation source.

When selecting the generated power from the power generation apparatus 7 of which the type does not correspond to the selection information, the power generation source selection unit 44 stores the amount of the generated power, as a power consumption amount that is out of selection, in the electric power amount information DR 32 in association with the electric power consumer CD corresponding to the selection information.

The power generation source selection unit 44 assigns the amount of electric power and selects one or more power generation apparatuses 7 of which the type corresponds to the selection information in units of predetermined period TA. Accordingly, when the electric power consumer CD transmits the selection information from the smart meter 11 to the electric power retail management apparatus 2 in units of predetermined period TA, the generated power of which the type meeting the request from the electric power consumer CD can be provided in units of predetermined period TA.

For example, the electric power consumer CD can select the power generation apparatus 7 that performs the solar power generation as the power generation source during a daytime period, and can select the power generation apparatus 7 that performs the wind power generation as the power generation source during a nighttime period.

The selection information may include information for changing the type of the power generation apparatus 7 corresponding to a range of the power consumption amount. For example, the selection information may be such that the electric power generated by the solar power generation is selected in a range up to 10 A, and the electric power generated by the thermal power generation is selected in a range from 10 A to 20 A. When such selection information is set in the selection information table of the electric power consumer CD, the power generation source selection unit 44 changes the type of the power generation apparatus 7 corresponding to the power consumption amount of the electric power consumer CD.

3.5. Power Generation Source Control Unit 45

The power generation source control unit 45 acquires information about the amount of electric power and the power generation apparatus 7 selected by the power generation source selection unit 44, and generates power supply/demand planning information and power generation control information for each electric power generating company CE on the basis of the acquired information for each predetermined period TA. The power generation control information includes information for designating a power generation amount during the next predetermined period TA.

At each time the power supply/demand planning information is generated, the power generation source control unit 45 transmits the power supply/demand planning information to the apparatus for managing the power transmission and distribution network 3. At each time the power generation control information for each electric power generating company CE is generated, the power generation source control unit 45 transmits the power generation control information to the corresponding power generation apparatus 7.

3.6. Rate Calculation Unit 46

The rate calculation unit 46 calculates a power rate charged to each electric power consumer CD on the basis of the information about the power consumption amount of each electric power consumer CD set in the power consumption amount table stored in the electric power amount information DB 32.

When calculating the power rate, the rate calculation unit 46 calculates an extra charge to the electric power consumer CD of which the power consumption amount exceeds the maximum power value. The maximum power value is a power value corresponding to the contract capacity. As described above, a value integrating electric power that is used exceeding the maximum power value is set in the power consumption amount table as the "excessive amount of electric power". The rate calculation unit 46 calculates the extra charge corresponding to the "excessive amount of electric power" and adds the extra charge to a normal rate to calculate the power rate.

Regarding the electric power consumer CD for whom the generated power from the power generation apparatus 7 of which the type does not correspond to the selection information (hereinafter, referred to as non-selected generated power) is selected, the rate calculation unit 46 calculates a discount rate for use of the non-selected generated power. A consumption amount of the non-selected generated power is stored in the electric power amount information DB 32 as the power consumption amount that is out of selection, and the rate calculation unit 46 calculates the power rate corresponding to the power consumption amount that is out of selection.

The rate calculation unit 46 may change the discount rate for the use of the non-selected generated power depending on a type of the non-selected generated power. The rate calculation unit 46 calculates, for example, the power rate so that the discount rate becomes higher as a degree of similarity to the generated power of which the type corresponds to the selection information becomes lower. Information about the degree of similarity between the power generation sources is stored, for example, in the electric power amount information DB 32. The rate calculation unit 46 calculates the discount rate for the use of the non-selected generated power on the basis of the information stored in the electric power amount information DB 32.

4. Processing Flow of the Electric Power Retail Management Apparatus 2

Figure 7:
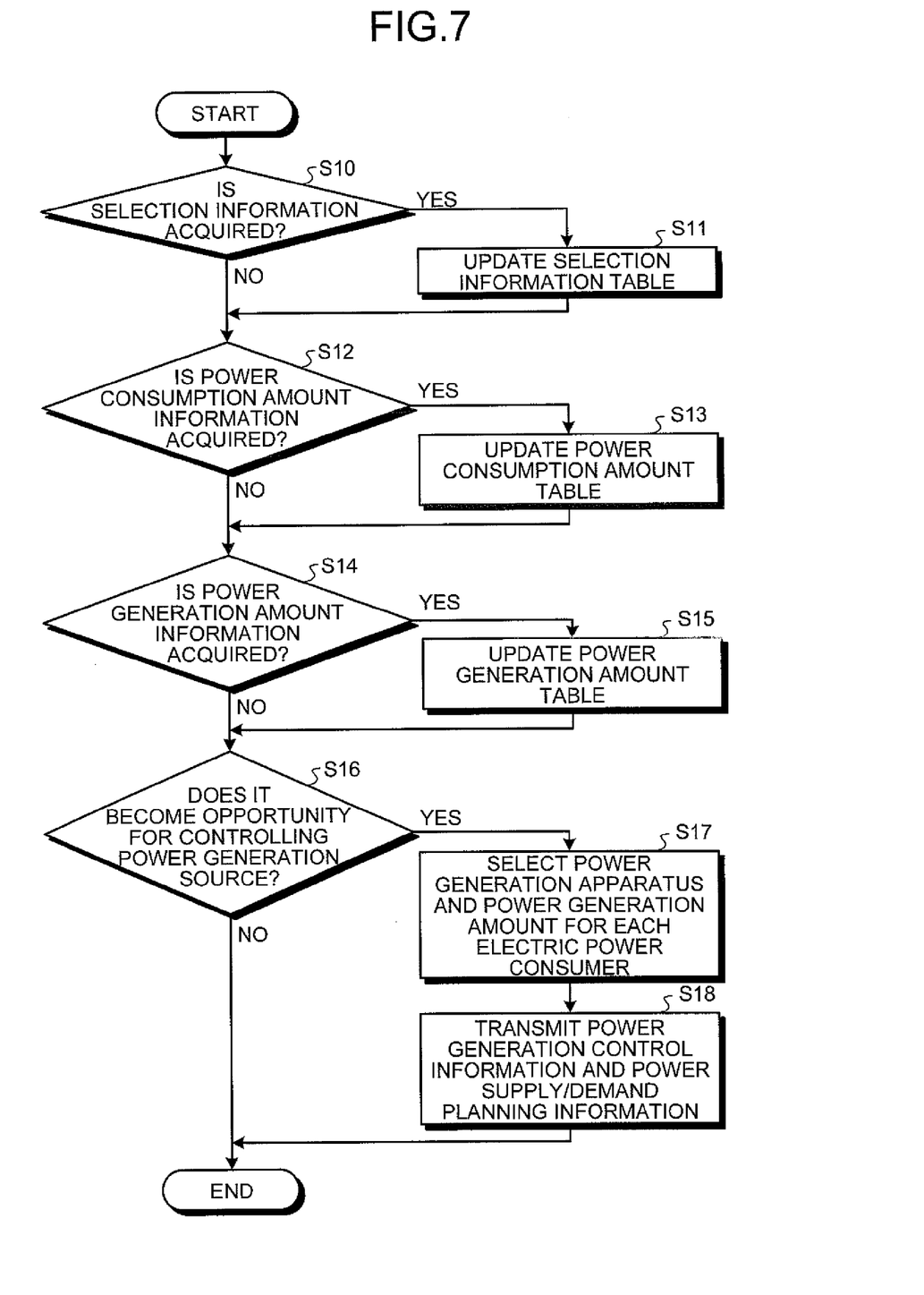
FIG. 7 is a flowchart illustrating an example of information processing by the electric power retail management apparatus according to the embodiment.

Next, the following describes a procedure for information processing by the electric power retail management apparatus 2 according to the embodiment. FIG. 7 is a flowchart illustrating an example of the information processing by the electric power retail management apparatus 2 according to the embodiment. Such processing is repeatedly performed by the control unit 22 of the electric power retail management apparatus 2.

As illustrated in FIG. 7, the control unit 22 of the electric power retail management apparatus 2 determines whether the selection information is acquired from the smart meter 11 of the electric power consumer CD (Step S10). If it is determined that the selection information is acquired (Yes at Step S10), the control unit 22 updates the selection information table stored in the selection information DB 31 on the basis of the acquired selection information (Step S11).

If it is determined that the selection information is not acquired (No at Step S10), the control unit 22 determines whether the power consumption amount information is acquired from the smart meter 11 of the electric power consumer CD (Step S12). If it is determined that the power consumption amount information is acquired (Yes at Step S12), the control unit 22 updates the power consumption amount table stored in the electric power amount information DB 32 on the basis of the acquired power consumption amount information (Step S13).

If it is determined that the power consumption amount information is not acquired (No at Step S12), the control unit 22 determines whether the power generation amount information is acquired from the power generation apparatus 7 (Step S14). If it is determined that the power generation amount information is acquired (Yes at Step S14), the control unit 22 updates the power generation amount table stored in the electric power amount information DB 32 on the basis of the acquired power generation amount information (Step S15).

If it is determined that the power generation amount information is not acquired (No at Step S14), the control unit 22 determines whether it becomes an opportunity for controlling the power generation source (Step S16). The opportunity for controlling the power generation source is set, for example, to timing before the current predetermined period TA elapses and when the power generation apparatus 7 can supply the generated power corresponding to the power generation control information to the power transmission and distribution network 4 in the next predetermined period TA.

If it is determined that it becomes the opportunity for controlling the power generation source (Yes at Step S16), the control unit 22 selects the power generation apparatus 7 and the power generation amount for each electric power consumer CD while keeping simultaneous commensurate control (Step S17). Next, the control unit 22 creates the power generation control information and the power supply/demand planning information for each power generation apparatus 7 on the basis of the selected power generation apparatus 7 and the power generation amount. Subsequently, the control unit 22 transmits the power generation control information to the corresponding power generation apparatus 7, and transmits the power supply/demand planning information to the apparatus for managing the power transmission and distribution network 3 (Step S18).

If the process at Step S18 is ended or it is determined that it does not become the opportunity for controlling the power generation source at Step S16 (No at Step S16), the control unit 22 ends the process. The control unit 22 calculates the power rate for each electric power consumer CD on the basis of the selection information table and the power consumption amount table for each predetermined period (for example, at the end of each month).

5. Other Embodiments

In the above embodiment, it is assumed that one or more power generation apparatuses 7 can be selected for each of the electric power consumer facilities 6. Alternatively, the smart meter 11 may select one or more power generation apparatuses 7 for each apparatus included in the electric power consumer facilities 6. For example, a refrigerator may select the power generation apparatus 7 that performs the solar power generation, and a lighting apparatus or an electric fan may select the power generation apparatus 7 that performs the wind power generation. In this case, on the basis of the selection information for each apparatus included in the electric power consumer facilities 6 transmitted from the smart meter 11, the power generation source control unit 45 selects one or more power generation apparatuses 7 corresponding to the selection information from among the power generation apparatuses 7 for each electric power consumer CD.

6. Effects

The electric power retail management apparatus 2 according to the embodiment includes the selection information DB 31 (an example of the selection information storage unit), the power consumption amount information acquisition unit 42, the power generation amount information acquisition unit 43, and the power generation source selection unit 44. The selection information DB 31 stores therein the selection information including the information corresponding to the type of power generation source selected by each of the electric power consumers CD. The power consumption amount information acquisition unit 42 acquires, as information about the power consumption amount, information about the amount of electric power supplied to the electric power consumers CD from the power transmission and distribution network 4. The power generation amount information acquisition unit 43 acquires, as information about the power generation amount, information about the amount of electric power supplied to the power transmission and distribution network 4 from the power generation apparatuses 7 (an example of the power generation source). The power generation source selection unit 44 selects, as the power generation apparatus 7 for supplying electric power corresponding to the power consumption amount, one or more power generation apparatuses 7 of which the type corresponds to the selection information from among the power generation apparatuses 7 for each electric power consumer CD on the basis of the power generation amount for each electric power consumer CD.

Accordingly, a virtual electric power transmission path is constructed between each of the electric power consumer facilities 6 and the power generation apparatus 7 of each electric power generating company CE, so that the request corresponding to the preference of the electric power consumer CD can be reflected. Accordingly, attractive electric power retail service can be provided, which enables the number of users to the electric power retail service to be increased.

The selection information also includes a proportion of the amount of electric power for each type of the power generation apparatus 7 selected by the electric power consumer CD. The power generation source selection unit 44 selects one or more power generation apparatuses 7 of which the type corresponds to the selection information on the basis of the power consumption amount of the electric power consumer CD and the proportion of the amount of electric power in the selection information.

Accordingly, various requests to the type of power generation source of the electric power consumer CD can be met, so that attractive electric power retail service can be provided.

The electric power retail management apparatus 2 according to the embodiment also includes the electric power amount information DB 32 (an example of a maximum power information storage unit) and the rate calculation unit 46. The electric power amount information DB 32 stores therein information about the maximum power value for each electric power consumer CD. The rate calculation unit 46 calculates an extra charge for the electric power consumer CD of which the power consumption amount exceeds the maximum power value.

Accordingly, for example, the extra charge can be charged to the electric power consumer CD who has used the electric power exceeding the contract capacity, which motivates the electric power consumer CD to avoid using the electric power exceeding the contract capacity. A contract capacity lower than a capacity of a breaker can be set without changing the breaker that has been already installed in the electric power consumer facilities 6.

If it is determined that the power generation apparatus 7 of which the type corresponds to the selection information cannot be selected, the power generation source selection unit 44 selects the power generation apparatus 7 of which the type is other than the type corresponding to the selection information.

Accordingly, the simultaneous commensurate control can be kept, so that it is possible to avoid a situation to purchase relatively expensive electric power from the electric power company CB, for example.

The electric power retail management apparatus 2 according to the embodiment also includes the selection information acquisition unit 41 that acquires the selection information transmitted from each smart meter 11 of the electric power consumers CD and stores the selection information in the selection information DB 31.

Accordingly, the electric power consumer CD can easily and quickly set the selection information to the electric power retail management apparatus 2.

The selection information acquisition unit 41 acquires the selection information for each predetermined period TA from each of the smart meters 11 of the electric power consumers CD. The power generation source selection unit 44 selects one or more power generation apparatuses 7 of which the type corresponds to the selection information for each predetermined period TA.

Accordingly, the electric power retail management apparatus 2 can provide generated power of which the type corresponds to the request from the electric power consumer CD in units of predetermined period TA.

7. Others

The electric power retail management apparatus 2 described above may be made with a plurality of server computers. The configuration thereof may be flexibly modified such that some functions are implemented by calling an external platform and the like through an application programming interface (API), network computing, and the like.

According to an aspect of the embodiment, provided are the electric power retail management method and the electric power retail management apparatus that can reflect the preference of the electric power consumer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric power retail management apparatus comprising:
   a selection information storage unit configured to store therein selection information including information corresponding to a type of a power generation source selected by each of a plurality of electric power consumers;
   a power generation amount information acquisition unit configured to acquire, as information about a power generation amount, information about an amount of electric power supplied from a plurality of power generation sources to a power transmission and distribution network;
   a power consumption amount information acquisition unit configured to acquire, as information about a power consumption amount, information about an amount of electric power supplied from the power transmission and distribution network to the electric power consumers; and
   a power generation source selection unit configured to select, as a power generation source for supplying electric power corresponding to the power consumption amount, one or more power generation sources of which the type corresponds to the selection information from among the power generation sources for each of the electric power consumers on the basis of the power generation amount.

2. The electric power retail management apparatus according to claim 1, wherein
   the selection information includes a proportion of the amount of electric power for each the type of the power generation source selected by the electric power consumer, and
   the power generation source selection unit selects one or more power generation sources of which the type corresponds to the selection information on the basis of the power consumption amount and the proportion of the amount of electric power.

3. The electric power retail management apparatus according to claim 1, further comprising:
   a maximum power information storage unit configured to store therein information about a maximum power value for each of the electric power consumers; and
   a rate calculation unit configured to calculate an extra charge to the electric power consumer of which the power consumption amount exceeds the maximum power value.

4. The electric power retail management apparatus according to claim 3, wherein the power generation source selection unit selects, upon determining that no power generation source corresponding to the selection information is selectable, a power generation source of which the type is other than the type corresponding to the selection information.

5. The electric power retail management apparatus according to claim 1, further comprising:
   a selection information acquisition unit configured to acquire the selection information transmitted from each apparatus of the electric power consumers and stores the acquired information in the selection information storage unit.

6. The electric power retail management apparatus according to claim 5, wherein
   the selection information acquisition unit acquires the selection information for each predetermined period from each of the electric power consumers, and
   the power generation source selection unit selects one or more power generation sources of which the type corresponds to the selection information for each predetermined period.

7. An electric power retail management method executed by a computer, the electric power retail management method comprising:
   acquiring, from a selection information storage unit, selection information including information corresponding to a type of a power generation source selected by each of a plurality of electric power consumers;
   acquiring, as information about a power generation amount, information about an amount of electric power supplied from a plurality of power generation sources to a power transmission and distribution, network;

acquiring, as information about a power consumption amount, information about an amount of electric power supplied from the power transmission and distribution network to the electric power consumers; and selecting, as a power generation source for supplying electric power corresponding to the power consumption amount, one or more power generation sources of which the type corresponds to the selection information from among the power generation sources for each of the electric power consumers on the basis of the power generation amount.

8. The electric power retail management method according to claim 7, wherein the selection information includes a proportion of the amount of electric power for each the type of the power generation source selected by the electric power consumer, and the selecting includes selecting one or more power generation sources of which the type corresponds to the selection information on the basis of the power consumption amount and the proportion of the amount of electric power.

9. The electric power retail management method according to claim 7, further comprising:

calculating an extra charge to the electric power consumer of which the power consumption amount exceeds a maximum power value for each of the electric power consumers.

10. The electric power retail management method according to claim 9, wherein the selecting includes selecting, upon determining that no power generation source corresponding to the selection information is selectable, a power generation source of which the type is other than the type corresponding to the selection information.

11. The electric power retail management method according to claim 7, further comprising:

acquiring the selection information transmitted from each apparatus of the electric power consumers, and storing the acquired information in the selection information storage unit.

12. The electric power retail management method according to claim 11, wherein the acquiring the selection information includes acquiring the selection information for each predetermined period from each of the electric power consumers, and the selecting includes selecting one or more power generation sources of which the type corresponds to the selection information for each predetermined period.

* * * * *